US011624706B2

(12) United States Patent
Amano et al.

(10) Patent No.: US 11,624,706 B2
(45) Date of Patent: Apr. 11, 2023

(54) CELLULOSE COMPOSITE DETERMINATION METHOD AND APPARATUS FOR COMPOSITE RESIN

(71) Applicant: Panasonic Corporation, Osaka (JP)

(72) Inventors: Tomoki Amano, Osaka (JP); Tatsuhiko Tsunoo, Osaka (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 0 days.

(21) Appl. No.: 17/555,831

(22) Filed: Dec. 20, 2021

(65) Prior Publication Data

US 2022/0205908 A1    Jun. 30, 2022

(30) Foreign Application Priority Data

Dec. 24, 2020    (JP) .............................. JP2020-215565

(51) Int. Cl.
*G01N 21/3563*    (2014.01)
*G01N 21/31*    (2006.01)
(Continued)

(52) U.S. Cl.
CPC ..... *G01N 21/3563* (2013.01); *G01N 21/3103* (2013.01); *G01N 21/359* (2013.01); *G01N 21/3581* (2013.01)

(58) Field of Classification Search
CPC ........... G01N 21/3563; G01N 21/3103; G01N 21/3581; G01N 21/359; G01N 2021/845;
(Continued)

(56) References Cited

U.S. PATENT DOCUMENTS 8,573,792 B2 * 11/2013 Bekku ..................... F24S 23/82
359/883
2004/0149911 A1    8/2004 Irie et al.
(Continued)

FOREIGN PATENT DOCUMENTS

EP    3 339 840    6/2018
JP    10-232166    9/1998
(Continued)

OTHER PUBLICATIONS

Extended European Search Report dated May 25, 2022 in corresponding European Patent Application No. 21214855.5.

*Primary Examiner* — David P Porta
*Assistant Examiner* — Gisselle M Gutierrez
(74) *Attorney, Agent, or Firm* — Wenderoth, Lind & Ponack, L.L.P.

(57) ABSTRACT

Composite resin containing cellulose is irradiated with infrared light, reflected light from the composite resin irradiated with the light is received, normalization is performed at a peak position maximized in a peak at 2800 cm$^{-1}$ or more and 3000 cm$^{-1}$ or less, which is a C—H stretching peak caused by the composite resin, in a reflection or absorption spectrum obtained by the reflected light, and a reflection or absorption spectrum for determination is obtained. The spectrum is used to acquire a ratio value of a spectral intensity (background intensity) at a position of 1000 cm$^{-1}$ or less according to a determined resin type and different from a wave number at which a peak derived from resin of the determined resin type is expressed, and a ratio of the spectral intensity (background intensity) is used so that a composite of cellulose combined in composite resin can be determined with high accuracy.

3 Claims, 9 Drawing Sheets

(51) Int. Cl.
  *G01N 21/3581*  (2014.01)
  *G01N 21/359*  (2014.01)
(58) Field of Classification Search
  CPC ........... G01N 2021/8472; G01N 21/55; G01N 2021/3595
  See application file for complete search history.

(56)     References Cited

U.S. PATENT DOCUMENTS

2010/0143681 A1*  6/2010  Yano ..................... B32B 27/06
                                                    428/216
2010/0272980 A1*  10/2010 Kowata ................. C08B 11/02
                                                    428/220
2012/0118520 A1*  5/2012  Noishiki ................ D21H 11/18
                                                    162/164.7
2019/0055697 A1*  2/2019  Sakai ..................... D21H 17/37
2021/0221987 A1*  7/2021  Hara .................. B29B 17/0026

FOREIGN PATENT DOCUMENTS

JP         2009-191375       8/2009
JP         2015-169569       9/2015
JP         2017-40508        2/2017
JP         2019-95291        6/2019

\* cited by examiner

CELLULOSE COMPOSITE DETERMINATION METHOD AND APPARATUS FOR COMPOSITE RESIN

BACKGROUND OF THE INVENTION

Field of the Invention

The present invention relates to a composite determination method and apparatus for cellulose contained in composite resin obtained by combining resin and cellulose with respect to a determination target in which a plurality of types of small pieces are gathered.

Description of the Related Art

Due to economic activities of mass consumption and mass disposal, global environmental problems such as global warming and resource depletion have occurred.

Under such circumstances, Home Appliance Recycling Law has been enforced in Japan since April 2001 in order to construct a resource circulation type society. Home Appliance Recycling Law requires recycling of used home electric appliances (an air conditioner, a television, a refrigerator, a freezer, a washing machine, a clothes dryer, or the like). In this manner, used home electric appliances are crushed into small pieces in a home electric appliance recycling factory, and then determined and collected for each material type using magnetism, wind power, vibration, or the like, and recycled as a recycled material. As a resin material, polypropylene, (hereinafter referred to as PP), polystyrene (hereinafter, referred to as PS), or acrylonitrile-butadiene-styrene (hereinafter, referred to as ABS) is often used in home electric appliances, and a resin material is determined and collected for each resin type by a determination apparatus utilizing an absorption characteristic in a near-infrared region (wave number range: 4000 to 10000 $cm^{-1}$) based on a molecular structure of resin.

This determination apparatus irradiates a small piece conveyed by a conveyor with light including a near-infrared region, detects a reflection or absorption spectrum from resin in a non-contact manner, and can determine a resin type, so that a large amount of small pieces can be determined.

In recent years, a material derived from nature have attracted attention from the viewpoint of ecomaterial, and in particular, a home electric appliance using composite resin obtained by combining cellulose with resin has started to be released. It is expected that cellulose will spread to many home electric appliances in the future, and it is conceivable that combining ratios and the like are different between companies. For the above reason, in the future, it is expected that it will be necessary to determine a substance containing two or more types of organic compounds such as composite resin obtained by combining cellulose with resin.

Patent Document 1 proposes a method in consideration of the above problem regarding a determination method for a substance in which a plurality of types of organic compounds are combined. In the technique described in Patent Document 1, filler gelation treatment is performed in order to analyze a composition in an unvulcanized rubber composition, a reflection spectrum as shown in FIG. 8 is acquired by Fourier transform infrared spectroscopy, and a peak (960 $cm^{-1}$, 903 $cm^{-1}$, 697 $cm^{-1}$) derived from styrene-butadiene rubber to be detected is identified from the obtained spectrum, so that the composition is determined. Further, in Patent Document 1, in a case where the filler gelation treatment is not performed on an unvulcanized rubber composition, a spectrum in which not only a peak derived from styrene-butadiene rubber but also a peak derived from natural rubber is mixed is detected.

PRIOR ART DOCUMENT

Patent Document

Patent Document 1: JP 2017-40508 A

SUMMARY OF THE INVENTION

In order to recycle resin obtained by combining cellulose, it is necessary to determine and divide the composite resin in a non-destructive manner for each ratio of combined cellulose.

However, in the analysis by a composition as in Patent Document 1, in the determination of composite resin in which the resin and the cellulose are molded, a peak intensity of the cellulose is low, and peaks of the resin, the cellulose, and an antioxidant added at the time of molding overlap each other, so that it is difficult to derive a composite ratio of the cellulose from a ratio of the peak intensity. Specifically, molded composite resin generally used in a home appliance contains an antioxidant. A peak of the antioxidant overlaps with O—H stretching which is a peak peculiar to cellulose. Also in C—O—C stretching, which is another peak peculiar to cellulose, peak positions peculiar to resin overlap depending on a type of the composite resin, and thus there is an issue that it is difficult to perform determination based on a peak value of an obtained spectrum. Furthermore, since a peak intensity of cellulose is not sharply expressed, there is also an issue that it is difficult to distinguish a difference between a spectrum of composite resin having a composite ratio of 10% or less and a spectrum of resin alone.

The present invention has been made to solve the above conventional issue, and an object of the present invention is to provide a cellulose composite determination method and apparatus for composite resin, in which when determining a composite of cellulose in composite resin using a reflection or absorption spectrum in a mid-infrared to far-infrared region (wave number range of 500 to 4000 $cm^{-1}$), attention is paid not to a peak value of an obtained spectrum but to a value of a ratio of a spectral intensity (that is, a background intensity) at a position different from a wave number at which a resin-derived peak is expressed, and an increase or decrease in the value of the ratio of the spectral intensity (that is, the background intensity) at the position different from the wave number at which the resin-derived peak is expressed is used to determine a composite of cellulose regardless of a composite resin type even at a low concentration.

In order to resolve the above issue, there is provided a cellulose composite determination method for composite resin according to an aspect of the present invention, comprising:

irradiating composite resin containing cellulose with infrared light;

receiving reflected light from the composite resin irradiated with the infrared light;

determining a resin type of the composite resin from a reflection or absorption spectrum obtained from the reflected light;

using a spectrum obtained by normalization with an intensity at a peak position that becomes a maximum intensity at a peak in a range of a wave number of 2800 cm$^{-1}$ or more and 3000 cm$^{-1}$ or less which is a C—H stretching peak caused by the composite resin in the reflection or absorption spectrum obtained by the reflected light to acquire a value of a ratio of a spectral intensity (background intensity) at a position that is 1000 cm$^{-1}$ or less in the spectrum and is different from a wave number at which a peak derived from resin of the determined resin type is expressed; and acquiring a value of a ratio of a spectral intensity (background intensity) in advance by a method similar to that for the composite resin using a spectrum of a sample of single resin which is contained in the composite resin and is acquired in advance and comparing the values to determine a composite of cellulose in the composite resin.

In order to resolve the above issue, there is provided a cellulose composite determination apparatus for composite resin according to another aspect of the present invention, comprising:

an irradiation unit that irradiates composite resin containing cellulose with infrared light;

a light receiving unit that receives reflected light from the composite resin irradiated with the infrared light;

a resin type determination unit that acquires a reflection or absorption spectrum from the reflected light obtained by the light receiving unit and determines a resin type of the composite resin from the acquired reflection or absorption spectrum;

a composite determination information acquisition unit that uses a spectrum obtained by normalization with an intensity at a peak position that becomes a maximum intensity at a peak in a range of a wave number of 2800 cm$^{-1}$ or more and 3000 cm$^{-1}$ or less which is a C—H stretching peak caused by the composite resin in the reflection or absorption spectrum obtained by the reflected light to acquire, as composite determination information, a value of a ratio of a spectral intensity (background intensity) at a position that is 1000 cm$^{-1}$ or less in the spectrum and is different from a wave number at which a peak derived from resin of the determined resin type is expressed; and a composite resin determination unit that compares a value of a ratio of a spectral intensity (that is, a background intensity) acquired by the composite determination information acquisition unit and a value of a ratio of a spectral intensity (that is, a background intensity) acquired in advance by a method similar to that for the composite resin using a spectrum of a sample of single resin which is contained in the composite resin and is acquired in advance to determine a composite of cellulose in the composite resin.

As described above, according to the cellulose composite determination method and apparatus for composite resin according to the aspects of the present invention, a wave number at a position different from a wave number of a peak position derived from resin at a wave number of 1000 cm$^{-1}$ or less according to the determined resin type is selected using a reflection or absorption spectrum in a determination target object, a ratio of the spectral intensity (that is, background intensity) at the selected wave number is acquired, and increase or decrease in a value of the ratio of the acquired spectral intensity (that is, background intensity) is used, so that a composite of cellulose combined in composite resin can be determined with high accuracy.

DESCRIPTION OF THE PREFERRED EMBODIMENTS

Hereinafter, embodiments of the present invention will be described in detail with reference to the diagrams of FIGS. 1 to 7.

First Embodiment

A cellulose composite determination method and apparatus for composite resin according to a first embodiment of the present invention irradiate composite resin and the like containing cellulose, such as a cellulose fiber, with infrared light, receive reflected light from the composite resin irradiated with the infrared light, determine a type of resin (that is, a resin type) of the composite resin from a reflection or absorption spectrum obtained by the reflected light, use a spectrum obtained by normalization with an intensity at a peak position that becomes a maximum intensity at a peak in a range of a wave number of 2800 cm$^{-1}$ or more and 3000 cm$^{-1}$ or less which is a C—H stretching peak caused by the composite resin in the reflection or absorption spectrum obtained by the reflected light to acquire a value of a ratio of a spectral intensity (that is, a background intensity) at a position that is 1000 cm$^{-1}$ or less in the spectrum and is different from a wave number at which a peak derived from resin of the determined resin type is expressed, and acquire, as composite determination information, a value of a ratio of a spectral intensity (that is, a background intensity) in advance by a method similar to that for the composite resin using a spectrum of a sample of single resin which is contained in the composite resin and is acquired in advance and compare the values to determine a composite of cellulose in the composite resin.

Here, in the first embodiment, values of background intensities are compared instead of comparing values of peak intensities.

As the definition of the peak intensity, the peak intensity means an intensity at which a spectrum is sharp at a wave number at which a peak derived from resin is expressed in an acquired optical spectral intensity.

In contrast, as the definition of the background intensity, the background intensity means a spectral intensity at a wave number different from that of a material-derived expressed peak in an acquired optical spectral intensity.

The reason why an intensity ratio is used is that normalization is performed with a top peak of resin on raw data.

Hereinafter, the first embodiment will be described in detail. In the first embodiment, the presence or absence of cellulose is determined.

Figure 1:
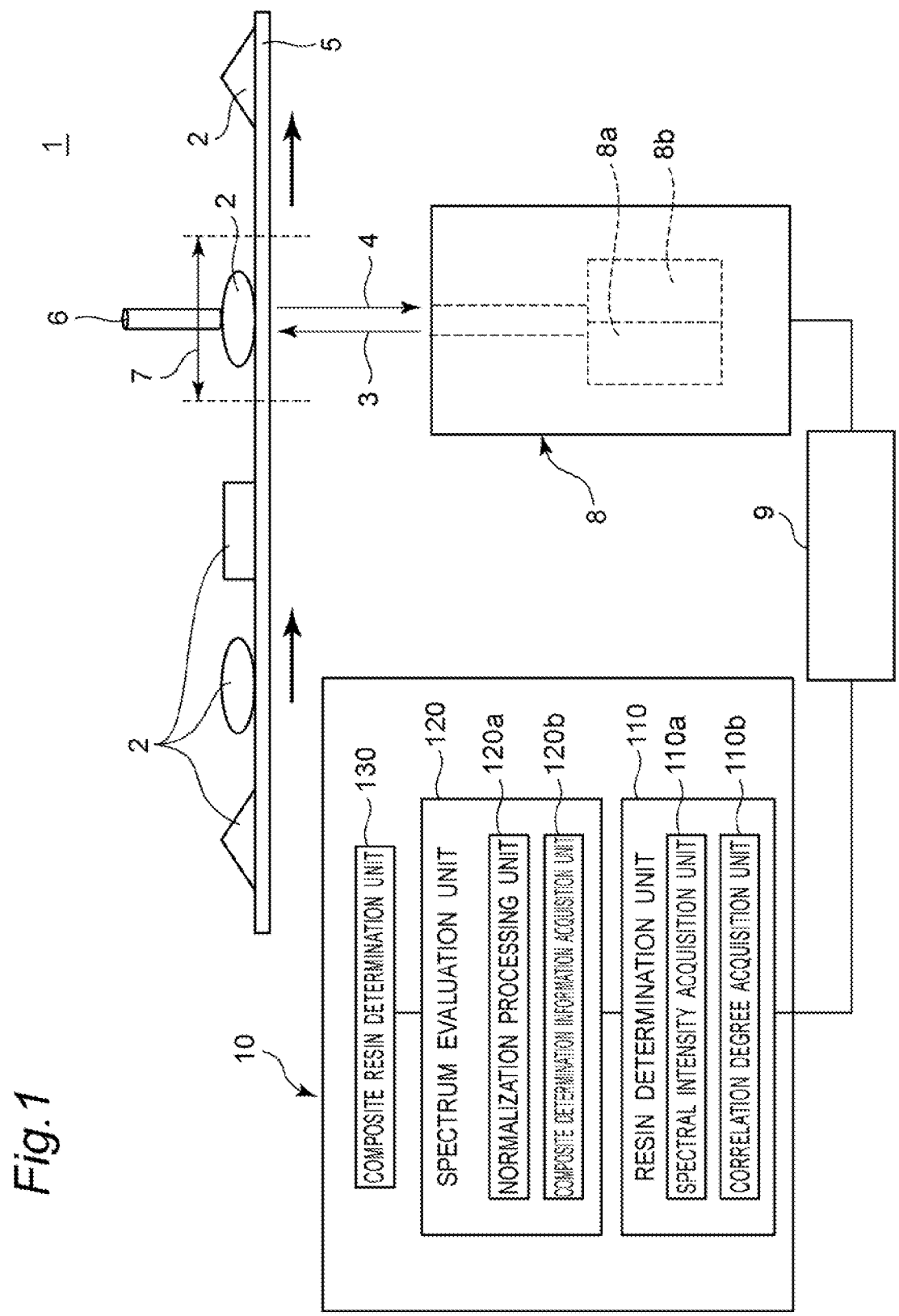
FIG. 1 is a schematic diagram of a cellulose composite determination apparatus for composite resin according to first and second embodiments of the present invention.

As illustrated in FIG. 1, a composite resin determination apparatus 1 includes at least an infrared detection unit 8 having a detection region 7, an irradiation unit 8a, and a light receiving unit 8b, and an arithmetic processing unit 10. Furthermore, the composite resin determination apparatus 1 may include a placement unit 5.

The placement unit 5 is exemplified by a belt conveyor, in which a belt moves at a constant speed, and composite resin 2 as a sample is placed on an upper surface of the placement unit 5, so that the composite resin 2 can be transferred. The placement unit 5 transfers the composite resin 2 to the detection region 7 along a longitudinal direction of the placement unit 5, and when the composite resin 2 is positioned in the detection region 7, the transfer is stopped.

The infrared detection unit 8 has a function of irradiating the composite resin 2 in the detection region 7 with an infrared ray and a function of receiving reflected light 4 of irradiation light 3 from the composite resin 2.

Figure 2:
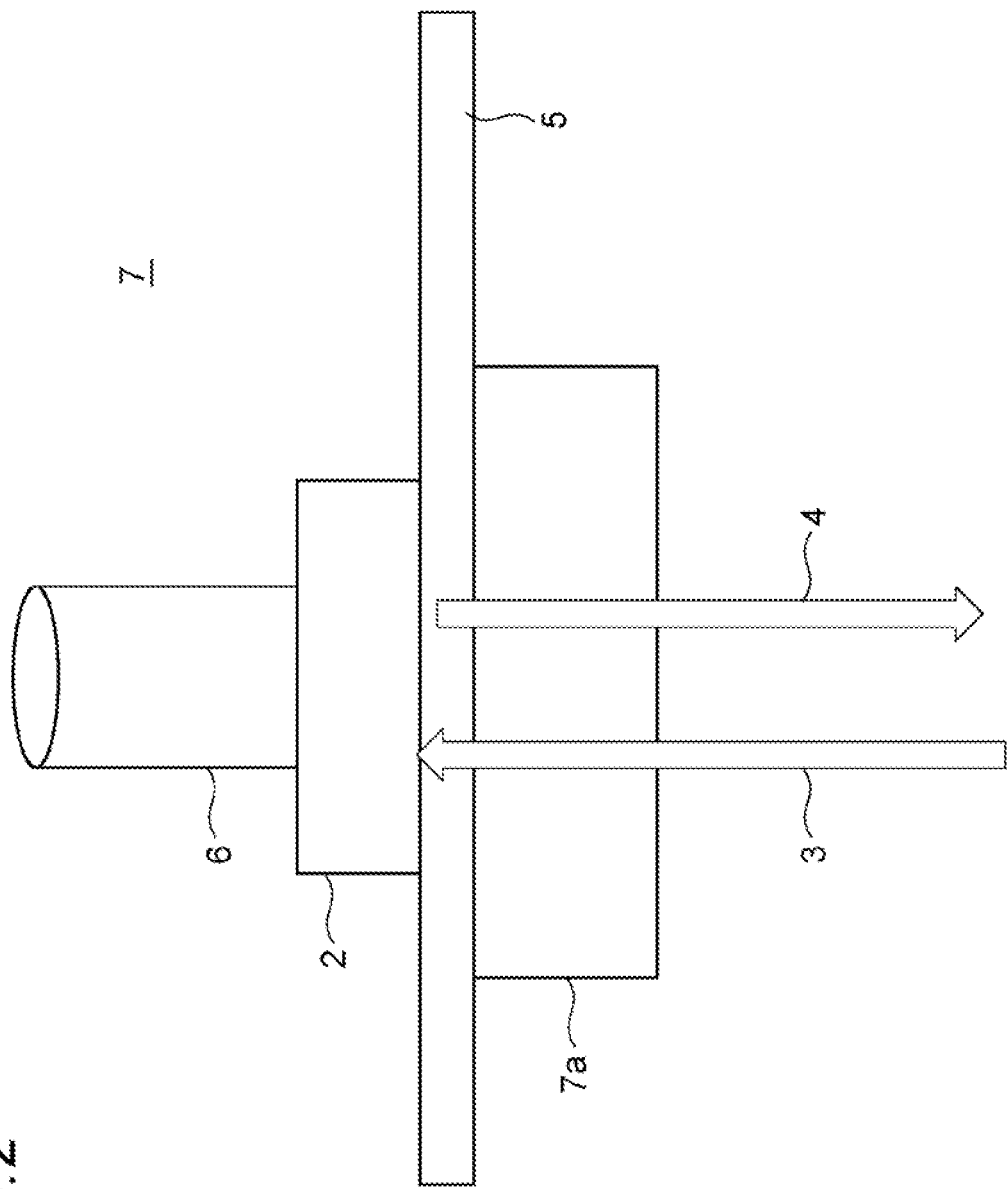
FIG. 2 is a schematic diagram of a detection region in the first and second embodiments of the present invention.

In the detection region 7, as illustrated in FIG. 2, a sample fixing mechanism 6 fixes the composite resin 2 to an upper surface of the placement unit 5 while bringing the composite resin 2 into close contact with a prism 7a side. As an example, the sample fixing mechanism 6 is a bar-like member that presses the composite resin 2 against the upper surface of the placement unit 5 downward from above. As an example of the infrared detection unit 8, at least the irradiation unit 8a as a mechanism that emits infrared light as an example of the irradiation light 3 from below to above and the light receiving unit 8b as a mechanism for detecting the reflected light 4 are included in the detection region 7. Therefore, the irradiation light 3 from the irradiation unit 8a passes through the prism 7a and the placement unit 5 and is applied to a lower surface of the composite resin 2, and the reflected light 4 reflected by the lower surface of the composite resin 2 passes through the placement unit 5 and the prism 7a and is received by the light receiving unit 8b. Information received and obtained by the light receiving unit 8b is input to the arithmetic processing unit 10. For this reason, the placement unit 5 is made from a material through which infrared light and reflected light of the infrared light can pass.

Note that each of the irradiation light 3 and the reflected light 4 needs to include a band having a wave number of 500 to 4000 $cm^{-1}$ in order that an absorption characteristic based on a molecular structure of the composite resin 2 is used.

The infrared detection unit 8 is connected to the arithmetic processing unit 10 via a digital data conversion unit 9.

The digital data conversion unit 9 converts an electric signal output according to the reflected light 4 by the infrared detection unit 8 into digital data.

The arithmetic processing unit 10 determines a composite resin type of the composite resin 2 as the determination target from a reflection or absorption spectrum of the composite resin 2 based on digital data of the reflected light 4 obtained by the light receiving unit 8b, and then determines a composite of cellulose. Specifically, the arithmetic processing unit 10 determines these based on digital data output from the digital data conversion unit 9.

For this reason, the arithmetic processing unit 10 roughly includes a resin type determination unit 110, a spectrum evaluation unit 120, and a composite resin determination unit 130.

The resin type determination unit 110 includes a spectral intensity acquisition unit 110a and a correlation degree acquisition unit 110b.

The spectrum evaluation unit 120 includes a normalization processing unit 120a and a composite determination information acquisition unit 120b.

The resin type determination unit 110 determines a resin type of the composite resin 2.

The spectral intensity acquisition unit 110a of the resin type determination unit 110 acquires a spectral intensity based on the reflected light 4. That is, first, analog data of the reflected light 4 received by the light receiving unit 8b is converted into digital data through the digital data conversion unit 9 from the light receiving unit 8b, and then input to the spectral intensity acquisition unit 110a of the arithmetic processing unit 10. In the digital data conversion unit 9, analog data of the reflected light 4 is converted into digital data of the reflected light 4. The spectral intensity acquisition unit 110a calculates a reflection or absorption spectrum of the composite resin 2 based on the input digital data of the reflected light 4. Here, for example, in order to represent a relationship between a reflection or absorption spectrum and a spectral intensity, relationship information converted into, for example, a table form or a graph form is prepared by being stored in advance in the spectral intensity acquisition unit 110a. The spectral intensity acquisition unit 110a acquires a spectral intensity for composite resin determination based on the calculated reflection or absorption spectrum from the relationship information.

The correlation degree acquisition unit 110b of the resin type determination unit 110 obtains a correlation degree from a spectral intensity and a spectrum waveform of single resin that is contained in the composite resin 2, the spectrum waveform being acquired in advance, on the basis of a spectral intensity for composite resin determination acquired by the spectral intensity acquisition unit 110a. When there are a plurality of spectrum waveforms in the single resin, the correlation degree acquisition unit 110b obtains a correlation degree of each of them. Furthermore, the correlation degree acquisition unit 110b obtains a highest correlation degree from among a plurality of correlation degrees and determines a resin type.

The normalization processing unit 120a of the spectrum evaluation unit 120 performs normalization processing on the spectral intensity acquired by the spectral intensity acquisition unit 110a at a peak of C—H stretching derived from the resin. That is, the normalization processing unit 120a performs normalization based on the acquired spectral intensity so that a maximum value of the peak intensity is one in the range of a wave number of 2800 $cm^{-1}$ or more and 3000 $cm^{-1}$ or less. A specific example will be described later.

The composite determination information acquisition unit 120b acquires, as composite determination information (in other words, composite determination target information), a value of a ratio of a spectral intensity (that is, background intensity) at a position different from a wave number at which the peak derived from the resin is expressed and at 1000 $cm^{-1}$ or less in the acquired spectrum by normalization by the normalization processing unit 120a. Further, the composite determination information acquisition unit 120b acquires in advance a value of a ratio of spectral intensities (that is, the background intensities) as composite determination information (in other words, composite determination reference information) in a similar manner to that for the composite resin 2 by using a spectrum of a sample of single resin which is acquired in advance and is determined to be contained in the composite resin 2.

Here, when not only the determination of a composite but also determination of a composite ratio is performed, it is necessary to teach spectrum data using a sample whose composite ratio is known in the determination of a composite ratio. Spectra of single resin of the same resin type and of resin having a known composite ratio of cellulose are acquired, and a calibration curve in which background intensity values of these pieces of resins are plotted at the composite ratio is created. Then, a composite ratio is determined between a background intensity obtained from an unknown sample used in actual measurement and the calibration curve. In the determination, a correlation coefficient, a regression analysis, or a multivariate analysis is used as a method for determining the composite ratio. Note that, as described above, the background intensity means a spectral intensity at a wave number different from a material-derived expressed peak among acquired optical spectral intensities. Therefore, by using a background intensity, it is possible to perform evaluation without mixture of peaks specific to a material composition, and thus, it is possible to evaluate a ratio of cellulose with high accuracy.

The composite resin determination unit 130 determines a composite of cellulose in the composite resin 2 by comparing values of ratios of their peak intensities (that is, background intensities) in the composite determination information acquisition unit 120b. Specifically, the composite resin determination unit 130 acquires a value of a ratio of a spectral intensity (that is, background intensity) at a position different from a wave number at which a peak derived from resin is expressed, between single resin and composite resin. As a result, in a case where a value of a ratio of a spectral intensity of resin as a determination target that is the composite determination target information is larger than a value of a ratio of a spectral intensity of single resin that is the composite determination reference information, it is determined that the resin is composite resin, that is, a composite of cellulose.

As a method for performing determination, a value of a ratio of a spectral intensity (that is, background intensity) at a position different from a wave number at which a peak derived from resin is expressed when single resin and cellulose composite resin are measured is defined as a threshold. When the presence or absence of cellulose is determined from a value of a predetermined threshold and a value obtained by actual measurement, correlation information is required.

Here, the correlation information is a difference in value from the threshold. As an example of the correlation information, a spectrum database is created, and a difference in value between an acquired spectrum and a threshold or the like can be considered.

The threshold is set from a background intensity obtained from a spectrum of cellulose composite resin. Measurement is performed in advance using a cellulose composite resin whose composite ratio to be determined is known, and a background intensity at a wave number not overlapping with peaks specific to resin and cellulose is determined. The presence or absence of cellulose is determined using the determined background intensity as a threshold.

Here, a determination method for composite resin according to the first embodiment will be described with reference to FIG. 3.

Figure 3:
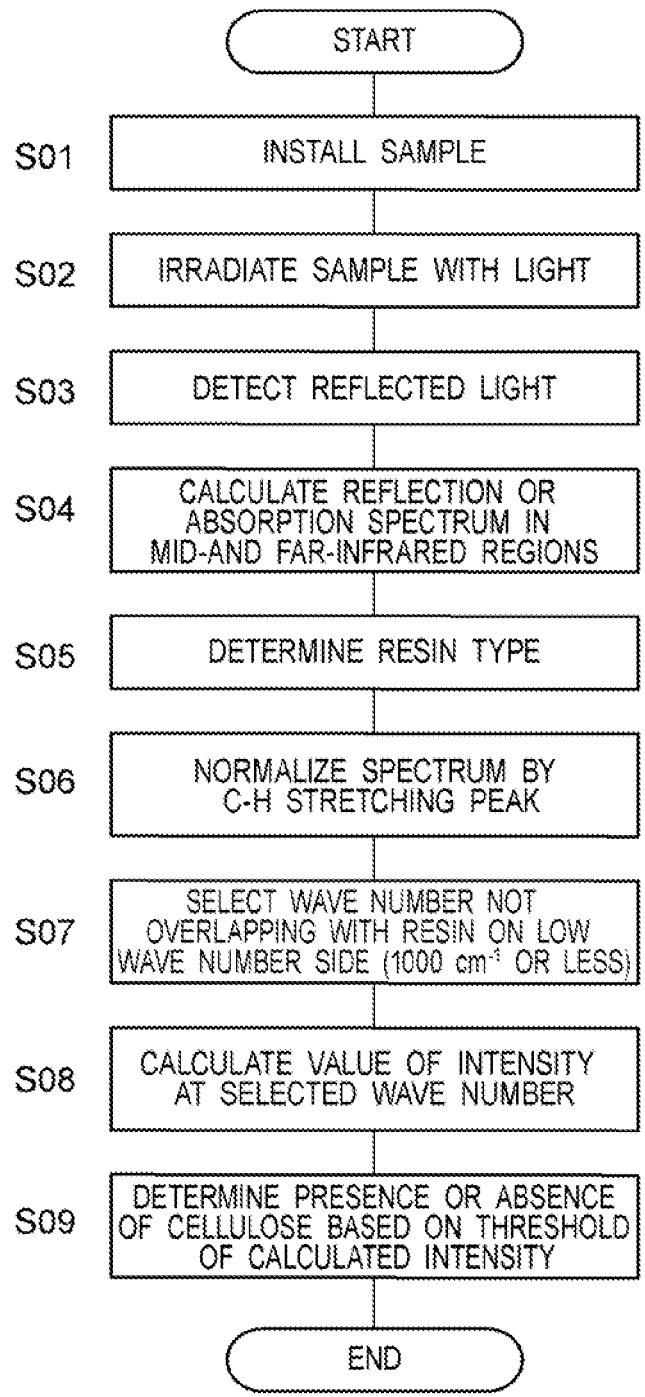
FIG. 3 is a flowchart of a cellulose composite determination method for composite resin according to the first embodiment of the present invention.

FIG. 3 is a flowchart showing a procedure of processing of the determination method for composite resin according to the first embodiment.

First, in step S01, a sample of the composite resin 2 combined with cellulose is transferred by the placement unit 5, and the composite resin 2 combined with cellulose is stopped at a position above the attenuated total reflection (ATR) prism 7a in the detection region V. At this position, the sample fixing mechanism 6 in FIG. 2 applies a load to the composite resin 2 by providing a pressing force in the direction of the prism 7a to bring the composite resin 2, the placement unit 5, and the prism 7a into close contact with each other. Here, the reason for using the ATR prism is that a background intensity used in the analysis is not expressed in principle unless FT-IR (that is, Fourier transform infrared spectroscopy) using the ATR prism is used.

Next, in step S02, a sample of the composite resin combined with cellulose in the detection region 7 is irradiated with infrared light as the irradiation light 3 from the irradiation unit 8a as shown in FIG. 1 via the prism 7a and the placement unit 5.

Next, in step S03, when the irradiation light 3 emitted from the irradiation unit 8a in step S02 is reflected as the reflected light 4 on a surface of the composite resin 2, the reflected light 4 is received via the placement unit 5 and the prism 7a and detected by the light receiving unit 8b.

Next, in step S04, information of the reflected light 4 detected by the light receiving unit 8b in step S03 is Fourier-transformed through the digital data conversion unit and input as digital data to the spectral intensity acquisition unit 110a of the resin type determination unit 110 of the arithmetic processing unit 10. The spectral intensity acquisition unit 110a calculates a spectrum in a mid- and far-infrared region based on the input digital data. Based on the calculated reflection or absorption spectrum, the spectral intensity acquisition unit 110a acquires a spectral intensity for composite resin determination using, for example, relationship information in a table form or a graph form representing a relationship between the reflection or absorption spectrum and a spectral intensity.

Next, in step S05, the correlation degree acquisition unit 110b of the resin type determination unit 110 obtains a correlation degree from the spectral intensity acquired in step S04 and a spectrum waveform of one or more types of single resin contained in the composite resin 2 and acquired in advance. When there are a plurality of spectrum waveforms in the single resin, the correlation degree acquisition unit 110b obtains a correlation degree of each of them. Furthermore, the correlation degree acquisition unit 110b obtains a highest correlation degree from among a plurality of correlation degrees and determines a resin type. In an example of FIG. 4A below, PP is determined as a resin type.

Figure 4A:
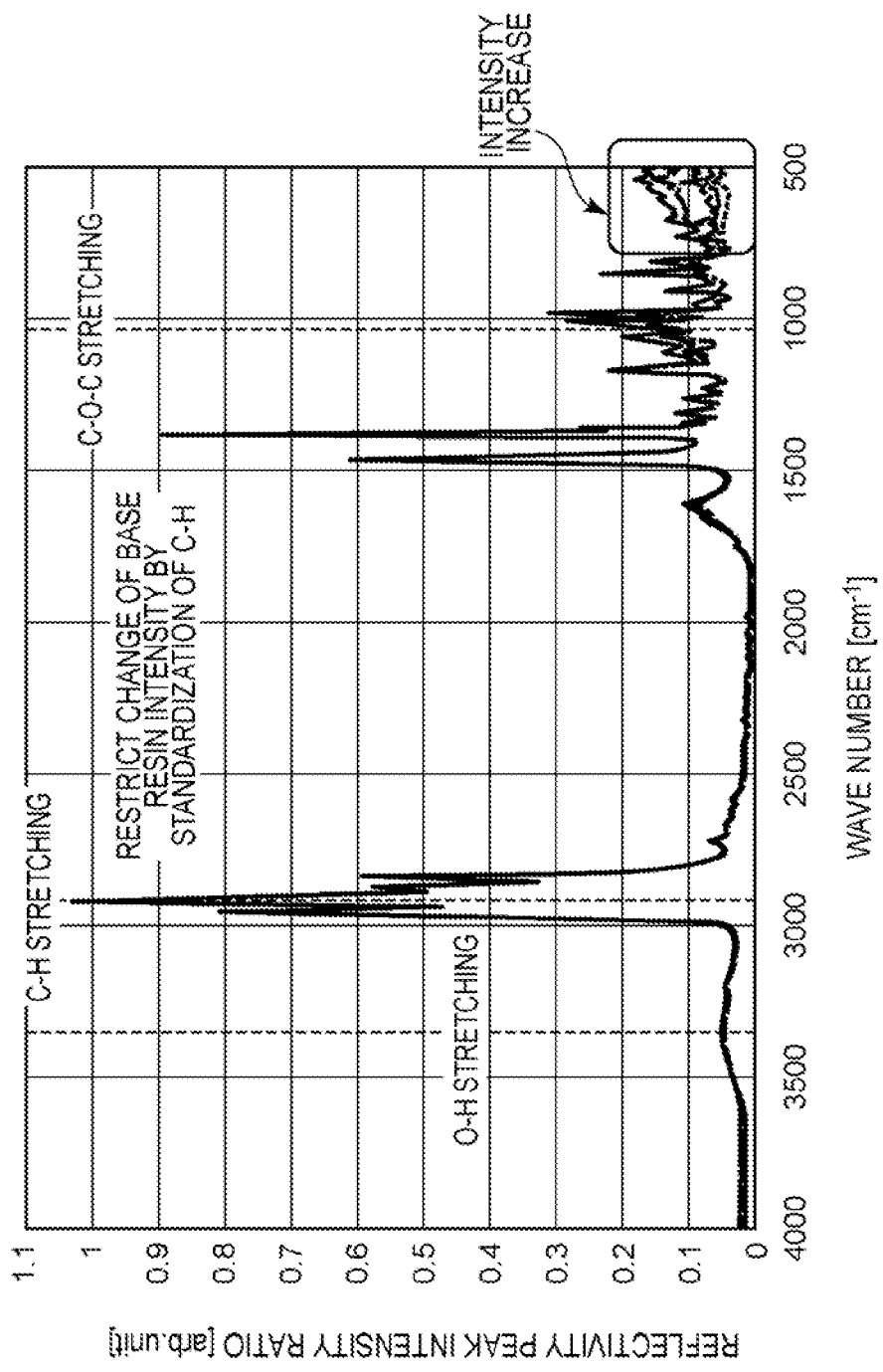
FIG. 4A is a graph of a composite resin spectrum obtained in the first embodiment of the present invention.
Figure 4B:
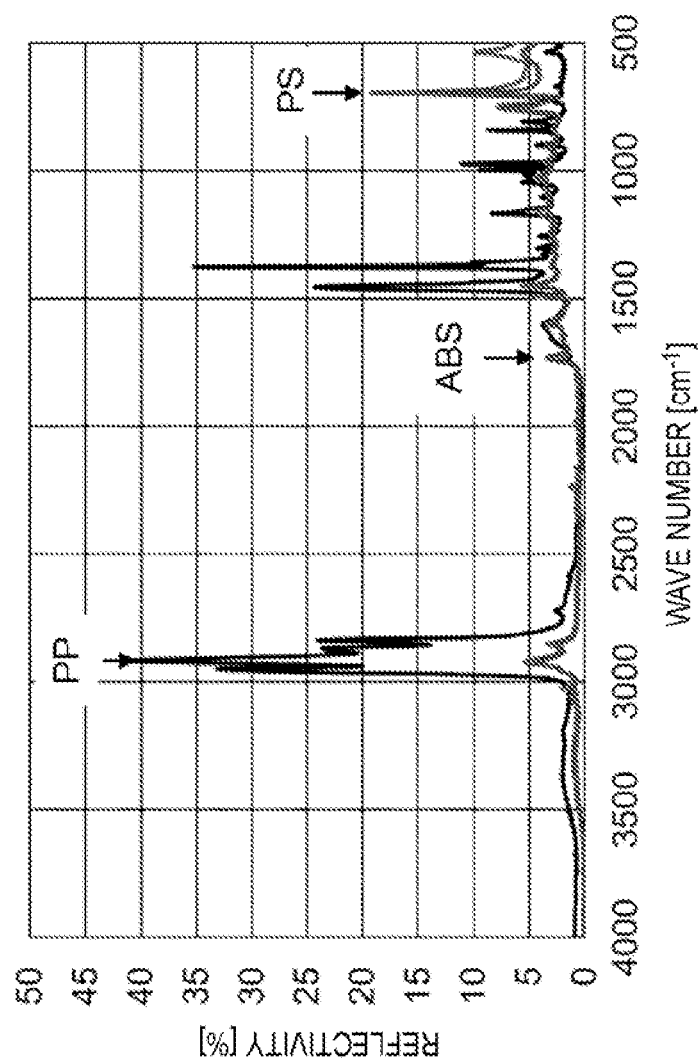
FIG. 4B is a graph of reflectivity and a wave number indicating that wave numbers of peak intensities of PP, ABS, and PS are different from each other in the first embodiment of the present invention.

Here, the correlation degree means a correlation coefficient used when a type of resin combined with cellulose is obtained by comparing a spectrum database with an acquired spectrum. From its result, a base resin type is determined. FIG. 4A shows spectra of a PP single resin and a PP resin combined with cellulose. FIG. 4B is spectrum data of PP, ABS, and PS, and shows that a wave number of a peak intensity of PP is completely different from a wave number of a peak intensity of ABS or PS. Here, the correlation degree of ABS or PS, which is resin other than PP, is lower than the correlation degree of PP.

Next, in step S06, the normalization processing unit 120a of the spectrum evaluation unit 120 of the arithmetic processing unit 10 performs normalization from the acquired spectral intensity so that a maximum value of a peak intensity is one in a range of a wave number of 2800 cm$^{-1}$ or more and 3000 cm$^{-1}$ or less which is a C—H stretching peak caused by the composite resin 2. In the present embodiment, as an example, FIG. 4A shows a spectrum of composite resin in which PP and cellulose are combined. In a case of PP, as an example, normalization is performed at a peak intensity of a wave number of 2917 cm$^{-1}$ by the normalization processing unit 120a. From FIG. 4A, at peak positions of O—H stretching and C—O—C stretching, which are peaks peculiar to cellulose, the normalization processing unit 120a performs normalization so that a maximum value of a peak intensity is one in a range of a wave number of 2800 cm$^{-1}$ or more and 3000 cm$^{-1}$ or less (that is, a range between two vertical dotted lines in FIG. 4A). The diagram shows that a difference in a reflectivity peak intensity ratio derived by performing the normalization is hardly distinguishable between the spectra.

As a result, by the processing of performing normalization so that the maximum value of the peak intensity is one in the range of the wave number of 2800 cm$^{-1}$ or more and 3000 cm$^{-1}$ or less which is the C—H stretching peak, a change in a background intensity ratio can be clarified as compared with that before the processing.

Next, in step S07, the composite determination information acquisition unit 120b of the spectrum evaluation unit 120 selects a wave number not overlapping with the resin (in this example, PP) of the determined resin type on the low wave number side (1000 cm$^{-1}$ or less). That is, for a value of the wave number selected here, the composite determination information acquisition unit 120b needs to determine a wave number that does not overlap with a peak position corresponding to the resin type determined in step S05. FIG. 4A shows a spectrum in a sample in which PP and cellulose are combined. In FIG. 4A, in order to calculate a background intensity at a wave number of 1000 cm$^{-1}$ or less, the composite determination information acquisition unit 120b needs to select a region not overlapping with a peak wave number of PP which is resin of the determined resin type, that is, a wave number not overlapping with each peak of $CH_2$=CH (wave number 990 cm$^{-1}$), HC=CH (wave number 970 cm$^{-1}$), $CH_2$COOH (wave number 940 cm$^{-1}$), CH (wave number 840 cm$^{-1}$), CH (wave number 810 cm$^{-1}$), $CH_2$ (wave number 720 cm$^{-1}$), and CH (wave number 670 cm$^{-1}$). In the example of FIG. 4A, the composite determination information acquisition unit 120b selects a wave number 500 cm$^{-1}$ as a value at which peaks of PP and cellulose do not overlap and a difference in penetration depth of infrared light is large.

As described above, the background intensity in the embodiment of PP is calculated from a wave number different from peak positions of PP and cellulose. Among them, 500 cm$^{-1}$ having a largest change due to a refractive index in the spectrum is selected as the wave number from a relationship of the penetration depth in FIG. 5.

Note that a ratio of a spectral intensity at a position different from a wave number at which a peak derived from resin is expressed is defined as a background intensity ratio, and a spectral intensity ratio at a wave number at which a peak derived from resin is expressed is defined as a peak intensity ratio.

Next, in step S08, the composite determination information acquisition unit 120b calculates a value of a background intensity ratio at the selected wave number as the composite determination information. Here, the composite determination information acquisition unit 120b acquires in advance a value of a background intensity ratio as the composite determination information by a method similar to that of the composite resin 2 using a spectrum of a sample of single resin which is resin contained in the composite resin 2 and is acquired in advance. As an example, in FIG. 4A, a value of a wave number is plotted on the horizontal axis, and a value of a reflectivity peak intensity ratio for each cellulose composite ratio at the wave number 500 cm$^{-1}$ selected in step S07 is plotted on the vertical axis. In this case, the reflectivity peak intensity ratio is 0.053 in a case of cellulose 0% with respect to resin of PP, 0.070 in a case of cellulose 5%, and 0.093 in a case of cellulose 10%, showing that the value of the reflectivity peak intensity ratio increases as the composite ratio of cellulose increases. The composite resin determination unit 130 acquires this information in advance.

Next, in step S09, a ratio of cellulose of the same resin type as that of the composite resin 2 as a determination target is determined in advance, a plurality of background intensity ratios in a region of 1000 cm$^{-1}$ or less are derived in advance by the composite determination information acquisition unit 120b from a sample whose ratio is known, and these are used as thresholds. A plurality of these thresholds are acquired in advance by the composite resin determination unit 130 of the arithmetic processing unit 10. The composite resin determination unit 130 compares the value of the background intensity ratio acquired in step S08 with each of a plurality of the thresholds described above, so that when the background intensity ratio is located between a plurality of the thresholds, a composite of cellulose and a composite ratio can be determined. For example, in a case where the value acquired in step S08 is larger than a first threshold and smaller than a second threshold among a plurality of the thresholds described above, it can be determined that cellulose is contained at a ratio of X % corresponding to the second threshold, there is a composite of cellulose, and a composite ratio is X %.

As described above, one threshold is set, and determination is performed based on whether a value is larger or smaller than the threshold. An embodiment classified by cellulose composite ratio for each percentage is plotted in FIG. 7. As an example, if the criterion for determination is set to 5%, the threshold is set to 0.06944 from FIG. 7, and if an acquired value is higher than the above value, it can be determined that 5% or more of cellulose is combined.

As described above, according to the first embodiment, a wave number different from a peak position derived from resin at a wave number of 1000 cm$^{-1}$ or less is selected according to a determined resin type by using a reflection or absorption spectrum in the composite resin 2 as a determination target, and a peak intensity ratio at the wave number is calculated and compared with a peak intensity ratio of known resin not combined with cellulose in advance, so that a composite of cellulose combined in the composite resin 2 and a composite ratio can be determined with high accuracy.

The reason why the determination can be made with high accuracy is as described below.

In the conventional analysis by a composition, in the determination of composite resin in which the resin and the cellulose are molded, a peak intensity of the cellulose is low, and peaks of the resin, the cellulose, and an antioxidant added at the time of molding overlap each other, so that it is difficult to derive a composite ratio of the cellulose from a ratio of the peak intensity. In contrast, in the first embodiment, by using a background intensity, it is possible to perform evaluation without mixture of peaks specific to a material composition, and thus, it is possible to evaluate a ratio of cellulose with high accuracy.

Second Embodiment

In the first embodiment, a wave number different from a peak position derived from resin at a wave number of 1000 cm$^{-1}$ or less is selected according to a determined resin type, a background intensity ratio at the wave number is calculated and compared with a background intensity ratio of known resin not combined with cellulose in advance, so that whether or not cellulose is combined in the composite resin 2 is determined.

However, the present invention is not limited to this configuration, and there is also a method in which, instead of comparing background intensity ratios, the composite determination information acquisition unit 120b acquires a background intensity from composite resin of which a composite ratio is known in advance and draws a calibration curve, and the composite resin determination unit 130 determines a composite and a composite ratio according to the correlation degree with the calibration curve. That is, in the composite determination information acquisition unit 120b, instead of comparing background intensity ratios, a calibration curve regarding a background intensity derived using a sample in which a cellulose composite ratio is known in advance is created, and then the composite resin determination unit 130 determines a composite and a composite ratio on the basis of a level of the correlation degree between the calibration curve and a value of the acquired background intensity.

In this method, the evaluation is performed not by a composition derived from a substance but by increase or decrease in an intensity of the background due to a difference in refractive index. Accordingly, this method is excellent in that a composite and a composite ratio can be more accurately determined even in a substance in which a peak due to a composition hardly appears.

Figure 5:
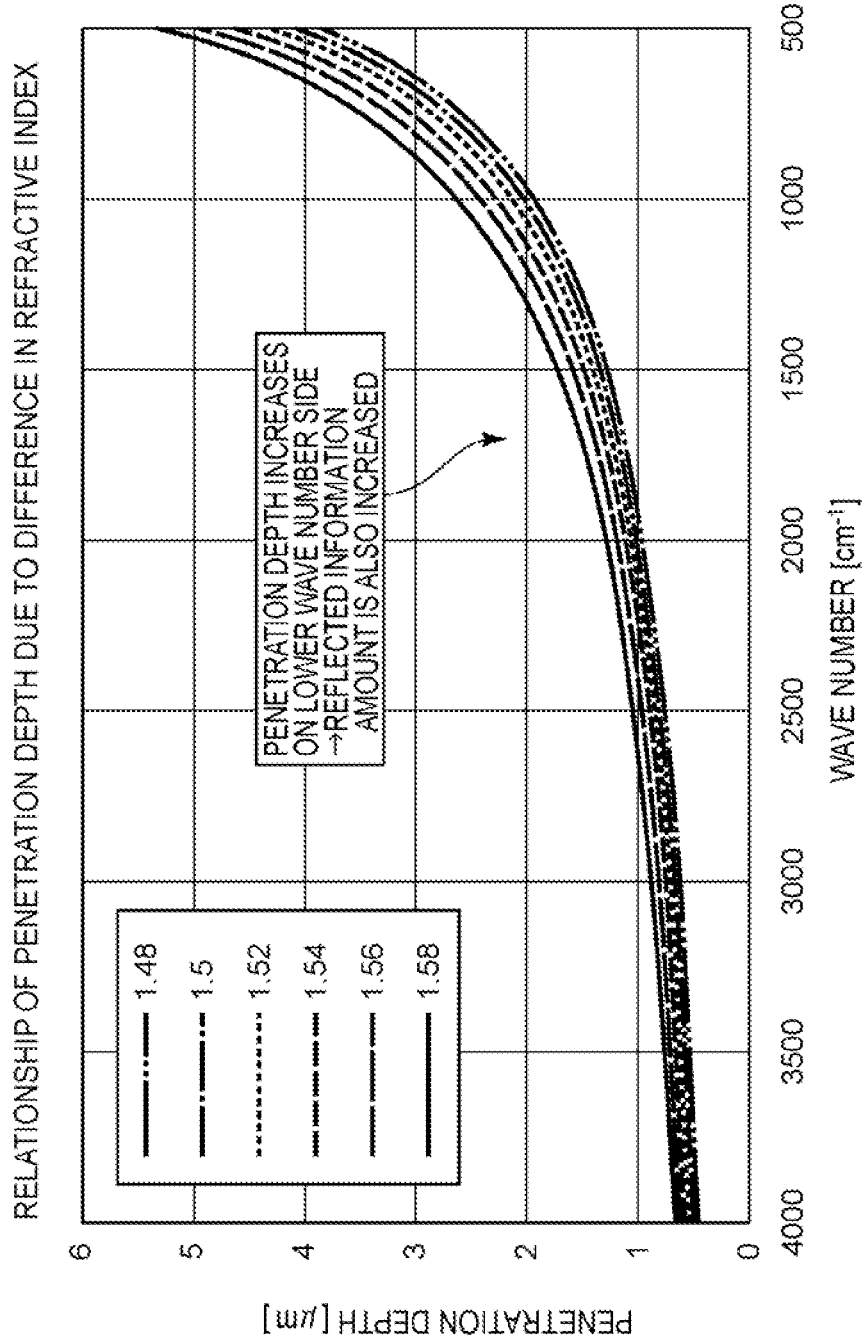
FIG. 5 is a graph showing a relationship of a penetration depth due to a difference in refractive index in the second embodiment of the present invention.

This background intensity is determined by a relationship of a penetration depth of infrared light due to a difference in refractive index between composite resin and cellulose. FIG. 5 illustrates a relationship of a penetration depth due to a difference in refractive index. A refractive index of PP is 1.48. Further, a refractive index of cellulose is 1.58. As a result, as cellulose is combined more, a penetration depth by which incident light enters becomes larger, and as the depth increases, a background intensity increases on the low wave number side. An equation representing a relationship between a penetration depth and a refractive index of a sample is as follows:

[Equation 1]

$$\text{Penetration-depth: } dp = \frac{\lambda}{2\pi n_1 \sqrt{\sin^2\theta - (n_1/n_2)^2}} [\mu m] \quad (1)$$

$dp$: Penetration-depth $\lambda$: Wave-number $\theta$: Incident-angle $n_1$: Refractive-index-of-prism $n_2$: Refractive-index-of-sample As factors for determining a penetration depth, there are a wavelength, an incident angle, a refractive index of a prism, and a refractive index of a sample. When a wave number (500 to 4000 cm$^{-1}$) is converted into a wavelength, the wavelength becomes 20 μm at a wave number 500 cm$^{-1}$, and the wavelength becomes 2.5 μm at a wave number 4000 cm$^{-1}$. Therefore, a wavelength becomes longer on the low wave number side, and a penetration depth increases. Since there is a restriction on a refractive index of a sample that can be determined depending on an incident angle of irradiation light, it is necessary to determine the incident angle according to a sample to be measured. In this case, an incident angle of irradiation light is 45 degrees. Since the prism has a larger penetration depth as a refractive index is lower, diamond having a lowest refractive index among materials used is used. In this case, the refractive index is 2.4. A refractive index of a sample is the refractive index of composite resin used for the measurement this time. A refractive index of cellulose is 1.58, a refractive index of PP which is composite resins generally used in home appliances is 1.48, a refractive index of PS is 1.60, and a refractive index of ABS is 1.51. Since a penetration depth of infrared light varies depending on a refractive index of a material, a penetration depth of irradiation light becomes larger as a refractive index becomes larger when considered in this equation. Accordingly, reflected light reflected and returned also becomes large. As a result, a background intensity increases, and determination is made using this increase or decrease. For this reason, determination is considered to be able to be made even in a case where these composite resin and cellulose are combined.

Figure 6:
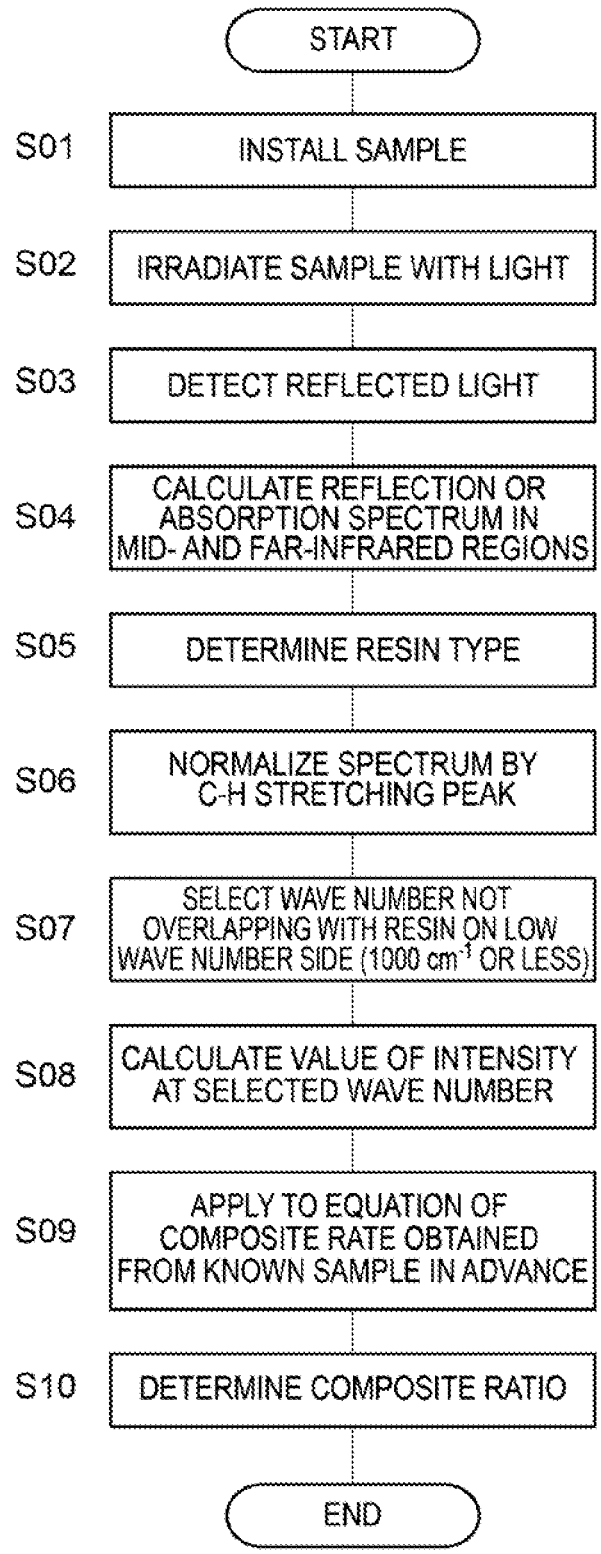
FIG. 6 is a flowchart of the cellulose composite determination method for composite resin according to the second embodiment of the present invention.

From the above relationship, FIG. 6 shows a flowchart for determining a composite ratio using a calibration curve. Steps S01 to S07 are the same as steps S01 to S07 in the first embodiment.

Figure 7:
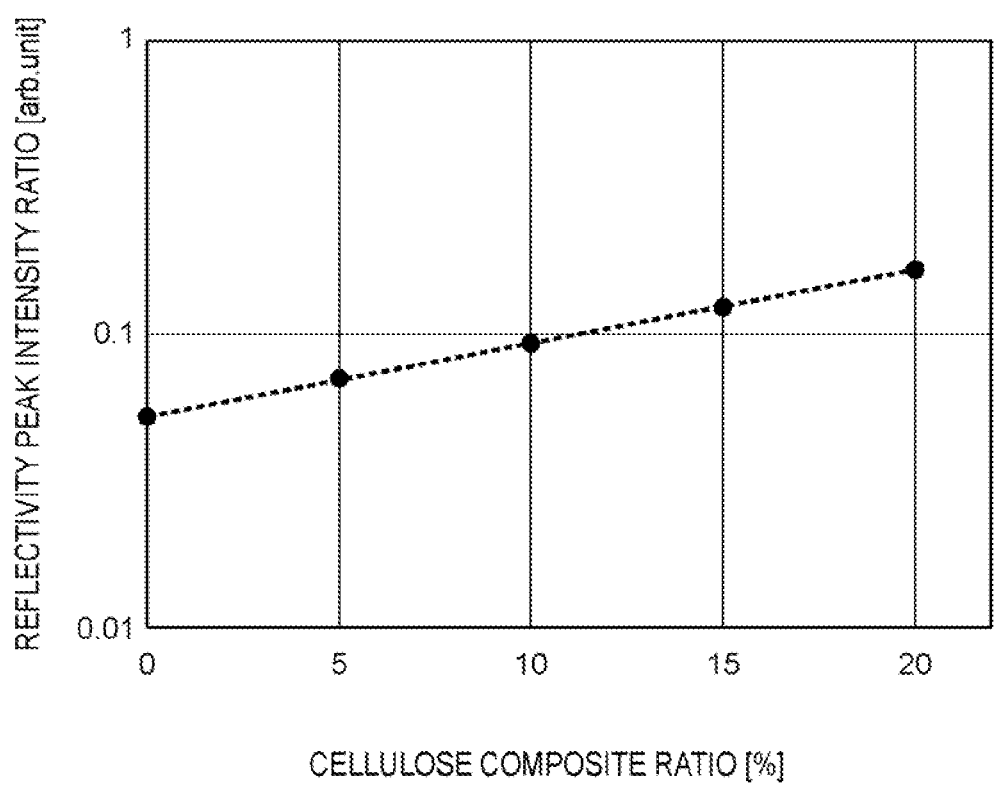
FIG. 7 is a graph in which, for each composite ratio of cellulose, a value of a reflectivity peak intensity ratio at a wave number 500 cm$^{-1}$ of PP and cellulose in the second embodiment of the present invention is plotted.
Figure 8:
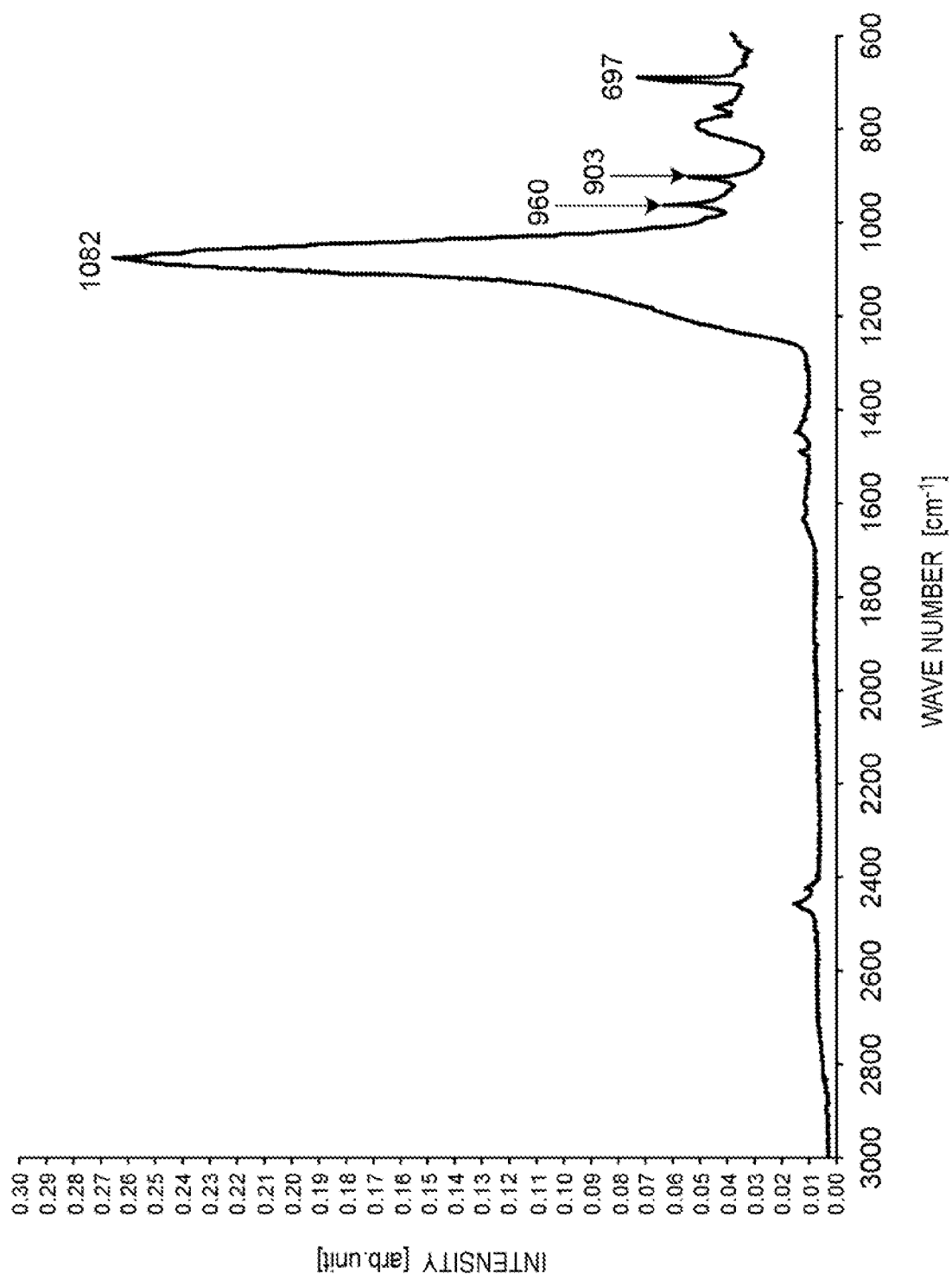
FIG. 8 is a graph of a reflection spectrum in a case where filler gelation treatment is performed on an unvulcanized rubber composition in conventional composite resin determination described in Patent Document 1.

In step S08, as in step S08 in the first embodiment, the composite determination information acquisition unit 120b calculates, as the composite determination information, a value of a reflectivity peak intensity ratio at a wave number at which resin and cellulose do not overlap at a wave number 1000 cm$^{-1}$. In FIG. 7, for each composite ratio of cellulose, a value of a reflectivity peak intensity ratio at a wave number 500 cm$^{-1}$ of PP and cellulose is plotted. From this result, when an approximate line is drawn by the composite determination information acquisition unit 120b,

[Equation 2]

$$\text{Reflectivity-peak-intensity-ratio:} I = 0.0532 e^{0.0561 x} \quad (2)$$

$I$: Reflectivity-peak-intensity-ratio $x$: Composite-ratio

An approximate curve shown in Equation of (2) is drawn.

In step S09, how the composite determination information acquisition unit 120b converts a value of the intensity calculated in step S08 into a composite ratio will be described. In order for the composite determination information acquisition unit 120b to calculate a composite ratio as the composite determination information from the value of the intensity, a reference value for the intensity is required. As a method for determining the reference value, it is necessary that the composite determination information acquisition unit 120b measures data on a relationship between a composite ratio of cellulose and a background intensity at the wave number selected in step S07 from a known sample in advance, and the composite determination information acquisition unit 120*b* creates a calibration curve from the measurement data.

In step S10, the composite resin determination unit 130 derives a composite ratio by applying a point having a high correlation intensity with a value of the background intensity obtained by measuring an unknown sample to the created calibration curve.

As described above, according to the composite ratio determination method and apparatus according to the second embodiment, by acquiring a background intensity from composite resin whose composite ratio is known in advance and drawing a calibration curve, it is possible to determine a composite of cellulose combined in the composite resin 2 and a composite ratio with high accuracy based on a correlation degree with the calibration curve, instead of using a reflection or absorption spectrum in a determination target to select a wave number different from a peak position derived from resin at a wave number of 1000 $cm^{-1}$ or less according to a determined resin type, calculating a peak intensity ratio at the wave number, and comparing the peak intensity ratio.

The reason why the determination can be made with high accuracy is as described below.

In the conventional analysis by a composition, in the determination of composite resin in which the resin and the cellulose are molded, a peak intensity of the cellulose is low, and peaks of the resin, the cellulose, and an antioxidant added at the time of molding overlap each other, so that it is difficult to derive a composite ratio of the cellulose from a ratio of the peak intensity. In contrast, in the second embodiment, by using a background intensity, it is possible to perform evaluation without mixture of peaks specific to a material composition, and thus, it is possible to evaluate a ratio of cellulose with high accuracy.

Note that by appropriately combining optional embodiment(s) or variation(s) among the various embodiments or variations described above, effect(s) of the embodiment(s) or variation(s) can be achieved. Further, a combination of embodiments, a combination of examples, or a combination of embodiment (s) and example (s) is possible, and a combination of features in different embodiments or examples is also possible.

In the cellulose composite determination method and apparatus according to the above aspect of the present invention, a composite of cellulose can be quickly determined for composite resin containing cellulose. Accordingly, from a plurality of determination target objects, composite resin having a high composite ratio of cellulose can be used in a recycling process or the like in which high purity is required.

Although the present invention has been fully described in connection with the embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A cellulose composite determination method for composite resin, comprising:
   irradiating composite resin containing cellulose with infrared light;
   receiving reflected light from the composite resin irradiated with the infrared light;
   determining a resin type of the composite resin from a reflection or absorption spectrum obtained from the reflected light;
   using a spectrum obtained by normalization with an intensity at a peak position that becomes a maximum intensity at a peak in a range of a wave number of 2800 $cm^{-1}$ or more and 3000 $cm^{-1}$ or less which is a C—H stretching peak caused by the composite resin in the reflection or absorption spectrum obtained by the reflected light to acquire a value of a ratio of a spectral intensity (background intensity) at a position that is 1000 $cm^{-1}$ or less in the spectrum and is different from a wave number at which a peak derived from resin of the determined resin type is expressed; and
   acquiring a value of a ratio of a spectral intensity (background intensity) in advance by a method similar to that for the composite resin using a spectrum of a sample of single resin which is contained in the composite resin and is acquired in advance and comparing the values to determine a composite of cellulose in the composite resin.

2. The cellulose composite determination method for composite resin according to claim 1, further comprising:
   after acquiring, as composite determination information, a value of the peak intensity ratio at a position that is 1000 $cm^{-1}$ or less and is different from a wave number at which a peak derived from resin of the determined resin type is expressed,
   instead of acquiring the value of the ratio of the spectral intensity (that is, the background intensity) in advance by a method similar to that for the composite resin using the spectrum of the sample of single resin which is contained in the composite resin and is acquired in advance and comparing a value of a ratio of a spectral intensity (background intensity) at a position different from a wave number at which a peak derived from resin of them is expressed to determine the composite of cellulose in the composite resin; and
   creating a calibration curve relating to a background intensity derived using a sample whose cellulose composite ratio is known in advance; and
   performing determination of a composite and a composite ratio based on a level of a correlation degree between the calibration curve and a value of the acquired background intensity.

3. A cellulose composite determination apparatus for composite resin, comprising:
   an irradiation unit that irradiates composite resin containing cellulose with infrared light;
   a light receiving unit that receives reflected light from the composite resin irradiated with the infrared light;
   a resin type determination unit that acquires a reflection or absorption spectrum from the reflected light obtained by the light receiving unit and determines a resin type of the composite resin from the acquired reflection or absorption spectrum;
   a composite determination information acquisition unit that uses a spectrum obtained by normalization with an intensity at a peak position that becomes a maximum intensity at a peak in a range of a wave number of 2800 $cm^{-1}$ or more and 3000 $cm^{-1}$ or less which is a C—H stretching peak caused by the composite resin in the reflection or absorption spectrum obtained by the reflected light to acquire, as composite determination information, a value of a ratio of a spectral intensity (background intensity) at a position that is 1000 $cm^{-1}$ or less in the spectrum and is different from a wave number at which a peak derived from resin of the determined resin type is expressed; and a composite resin determination unit that compares a value of a ratio of a spectral intensity (that is, a background intensity) acquired by the composite determination information acquisition unit and a value of a ratio of a spectral intensity (that is, a background intensity) acquired in advance by a method similar to that for the composite resin using a spectrum of a sample of single resin which is contained in the composite resin and is acquired in advance to determine a composite of cellulose in the composite resin.

* * * * *